Patented Oct. 9, 1951

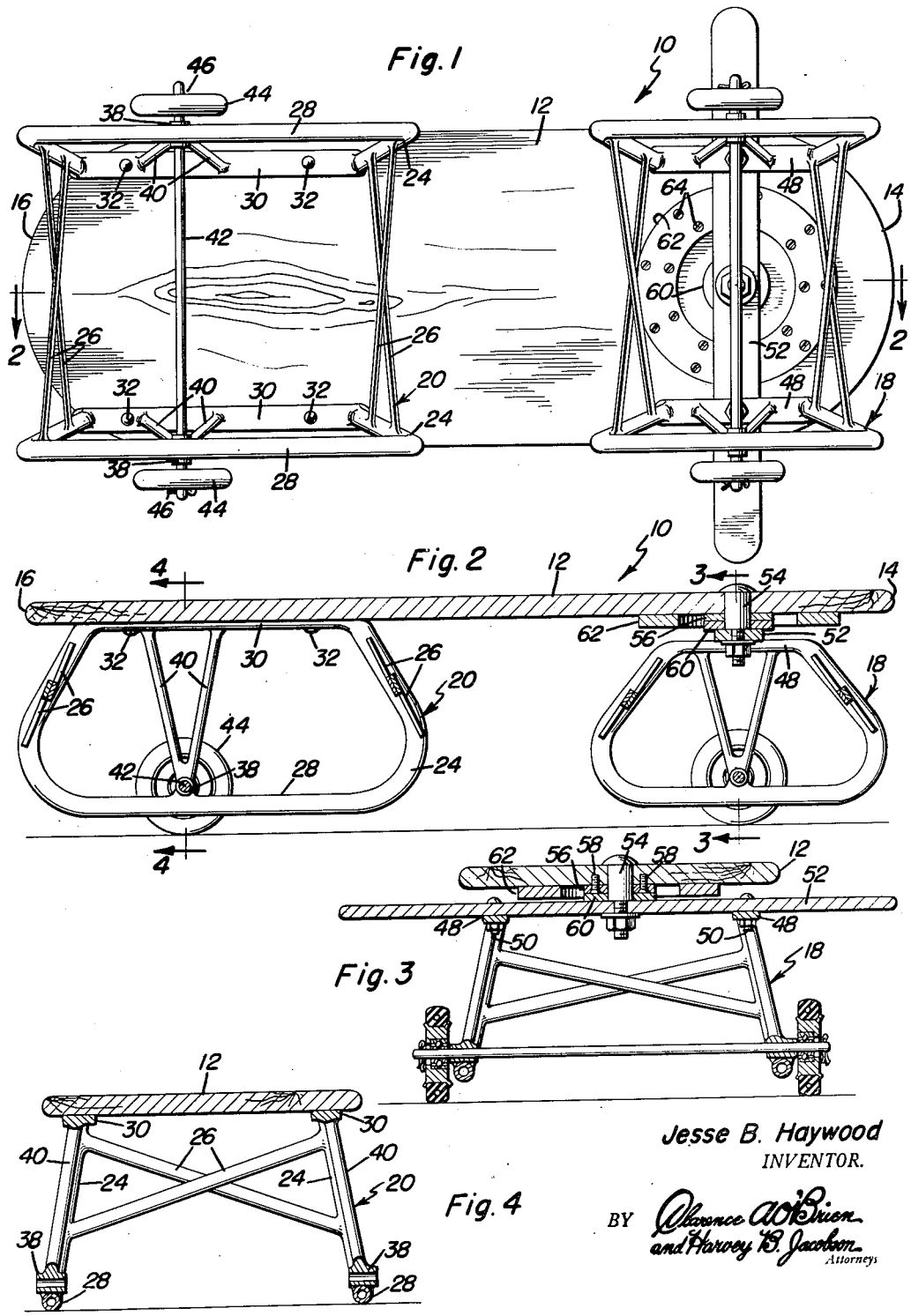

2,570,674

UNITED STATES PATENT OFFICE 2,570,674

CONVERTIBLE SLED AND COASTER

Jesse B. Haywood, Concord, N. C.

Application March 9, 1950, Serial No. 148,631

1 Claim. (Cl. 280—8)

This invention relates to new and useful improvements and structural refinements in vehicles, and the principal object of the invention is to provide a vehicle of the character herein described, such as may be conveniently and effectively employed during summer for traveling on the ground, as well as during winter for traveling on snow or ice.

The above object is achieved by providing the vehicle with runners so as to facilitate travel over snow, and also providing the runners with demountable wheels for traveling over ground while the runners themselves are disposed in elevated positions.

An important feature of the invention resides in the provision of means for steering the vehicle, this being achieved by bodily turning one of the runner and wheel units about a fulcrum on the load receiving platform with which the vehicle is equipped.

Some of the advantages of the invention reside in its simplicity of construction, in its efficiency, in its sturdiness, in its pleasing appearance, and in its adaptability to economical manufacture.

With the above more important objects in view and such other objects as may become apparent as this specification proceeds, the invention consists essentially of the arrangement and construction of parts as illustrated in the accompanying drawings in which:

Figure 1 is an underside plan view of the invention;

Figure 2 is a longitudinal sectional view thereof, this view being taken substantially on the plane of the line 2—2 in Figure 1;

Figure 3 is a transverse sectional view, taken substantially on the plane of the line 3—3 in Figure 2; and, Figure 4 is a transverse sectional view, taken substantially on the plane of the line 4—4 in Figure 2 but with the wheels and axle removed.

Like characters of reference are employed to designate like parts in the specification and throughout the several views.

Referring now to the accompanying drawing in detail, the invention consists of a convertible sled and coaster which is designated generally by the reference character 10 and embodies in its construction an elongated load-receiving platform 12 having front and rear ends 14, 16, respectively. Front and rear runner units or trucks designated generally by the respective characters 18, 20 are provided under the platform 12, these two units being similar in construction but the rear unit 20 being rigidly secured to the platform while the front unit 18 is steerable about a fulcrum or pivot whereby it is attached to the platform.

The rear runner unit 20 includes in its construction a pair of transversely spaced side pieces 24 which are rigidly connected together by pairs of crossed braces 26, the side pieces 24 affording lower members 28 and upper members 30 the latter being rigidly secured to the rear end portion of the platform 12 as indicated at 32.

Substantially V-shaped braces are provided between the member 30 and 28. Formed in the lower portions of the braces 40 are transversely aligned bearings 38.

An axle 42 is mounted in the bearings 38 and has removable wheels 44 journalled on its end portions, said wheels being secured by cotter pins 46. It will be noted that the wheels 44 project downwardly below the lower members 28 of the runner unit, so as to facilitate travel over ground while the runner units are elevated. However, by simply removing the wheels 44 and the axle 42, the lower members 28 of the runner unit may slide over snow or ice when the invention is used as a sled.

As has been already stated, the front runner unit 18 is similar in construction to the rear runner unit 20, but the top members 48 of the front runner unit, rather than being secured rigidly to the platform 12, are secured by suitable bolts 50 to a steering handle or bar 52 which extends transversely under the platform and is substantially longer than the width of the platform so that the end portions of the handle project laterally to both sides of the platform, as is illustrated in Figures 1 and 3.

A fulcrum element or pivot pin 54 is provided in the front end portion of the platform and extends through the steering handle 52 for rotatably or pivotally attaching the front runner unit 18 to the platform, it being noted that an annular washer 56 is secured as at 58 to the underside of the platform concentrically with the pivot pin 54 and abuts a similar washer 60 which is interposed between the washer 56 and the steering handle 52. By virtue of this arrangement, any slackness or lost motion in the pivot is eliminated, and as a further step in this direction, an annulus 62 is secured as at 64 to the underside of the platform 12 concentrically with the pivot 54 and is disposed slightly above the steering handle 52, as is best shown in Figure 3. However, if there is any tendency for the platform 12 to rock from side to side, the annulus 62 will contact the upper surface of the steering handle 52 so as to eliminate excessive rocking movement.

It is believed that the advantages and use of the invention will be clearly understood from the foregoing disclosure, and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having thus described the invention, what is claimed as new is:

A convertible sled and coaster comprising a platform, front and rear trucks mounted beneath said platform, said front truck being reversible and including duplicate side frames comprising upper bars, downwardly diverging legs depending from the ends of said bars, tubular runners terminating in upwardly curved end portions integral with the legs, substantially V-shaped braces extending between the runners and bars at intermediate points, bearings in the lower portions of said braces, a removable transverse axle in the bearings, removable wheels on said axle extending below the runners, a steering bar fixed transversely on the first named bars and projecting laterally therebeyond, said steering bar paralleling the axle in the vertical plane thereof, and means rotatably connecting the steering bar to the platform.

JESSE B. HAYWOOD.

REFERENCES CITED

The following references are of record in the file of this patent:

UNITED STATES PATENTS

| Number | Name | Date |
|---|---|---|
| 1,350,929 | McCarthy | Aug. 24, 1920 |
| 1,452,636 | Bowden | Apr. 24, 1923 |
| 1,546,805 | St. Pierre | July 21, 1925 |
| 2,043,374 | Gelbman | June 9, 1936 |